United States Patent
Jakupca et al.

(10) Patent No.: US 11,472,928 B2
(45) Date of Patent: Oct. 18, 2022

(54) USE OF A POLYMERIC POLYPHOSPHITE AS A POLYMER PROCESSING AID

(71) Applicant: DOVER CHEMICAL CORPORATION, Dover, OH (US)

(72) Inventors: Michael R Jakupca, Canton, OH (US); Jacob M. Lance, Dover, OH (US); John T. Regula, Baltic, OH (US)

(*) Notice: Subject to any disclaimer, the term of this patent is extended or adjusted under 35 U.S.C. 154(b) by 0 days.

(21) Appl. No.: 16/969,959

(22) PCT Filed: Feb. 12, 2019

(86) PCT No.: PCT/US2019/017612
§ 371 (c)(1),
(2) Date: Aug. 13, 2020

(87) PCT Pub. No.: WO2019/160845
PCT Pub. Date: Aug. 22, 2019

(65) Prior Publication Data
US 2020/0407513 A1   Dec. 31, 2020

Related U.S. Application Data
(63) Continuation of application No. 15/896,119, filed on Feb. 14, 2018, now abandoned.

(51) Int. Cl.
C08G 79/04 (2006.01)
C08L 23/06 (2006.01)

(52) U.S. Cl.
CPC .............. *C08G 79/04* (2013.01); *C08L 23/06* (2013.01)

(58) Field of Classification Search
CPC ......... C08G 79/04; C08L 85/02; C08L 23/00; C08L 25/00; C08L 27/00
See application file for complete search history.

(56) References Cited

U.S. PATENT DOCUMENTS

| | | |
|---|---|---|
| 3,047,608 A | 7/1962 | Friedman et al. |
| 3,133,043 A | 5/1964 | Rosenfelder et al. |
| 3,210,319 A | 10/1965 | Huhn et al. |
| 3,359,348 A | 12/1967 | Friedman |
| 3,375,304 A | 3/1968 | Larrison |
| 3,378,524 A | 4/1968 | Larrison |
| 3,476,699 A | 11/1969 | Kauder et al. |
| 3,655,832 A | 4/1972 | Kauder et al. |
| 3,855,360 A | 12/1974 | Shim |
| 4,221,700 A | 9/1980 | Minagawa et al. |
| 4,948,543 A | 8/1990 | Pawlowski et al. |

(Continued)

FOREIGN PATENT DOCUMENTS

| | | |
|---|---|---|
| DE | 1794321 A1 | 5/1972 |
| DE | 229995 A1 | 11/1985 |

(Continued)

OTHER PUBLICATIONS

International Search Report issued in PCT/US2019/017612 dated May 2, 2019 (2 pages).

(Continued)

*Primary Examiner* — Robert C Boyle

(57) ABSTRACT

The invention pertains generally to a polymer composition comprising a certain secondary polymeric polyphosphite anti-oxidant, that can also act as a polymer processing aid alone or in combination with another polymer processing aid.

5 Claims, 2 Drawing Sheets

(56) References Cited

U.S. PATENT DOCUMENTS

| | | | |
|---|---|---|---|
| 5,278,272 | A | 1/1994 | Lai et al. |
| 5,654,430 | A | 8/1997 | Pitteloud |
| 5,854,352 | A | 12/1998 | Chisolm et al. |
| 5,969,015 | A | 10/1999 | Zinke et al. |
| 6,455,665 | B1 | 9/2002 | Barnette et al. |
| 6,541,549 | B2 | 4/2003 | Archibald et al. |
| 6,770,693 | B2 | 8/2004 | Stein et al. |
| 7,186,853 | B2 | 3/2007 | Enlow et al. |
| 7,199,170 | B2 | 4/2007 | Archibald et al. |
| 7,468,410 | B2 | 12/2008 | Chafin et al. |
| 7,632,086 | B2 | 12/2009 | Veariel et al. |
| 8,110,262 | B2 * | 2/2012 | Lanier .................. C08L 23/04 428/35.7 |
| 8,563,637 | B2 | 10/2013 | Jakupca et al. |
| 8,981,042 | B2 | 3/2015 | Jakupca et al. |
| 2004/0183054 | A1 | 9/2004 | Stevenson et al. |
| 2007/0088108 | A1 | 4/2007 | Evans et al. |
| 2008/0071016 | A1 | 3/2008 | Boettcher et al. |
| 2009/0326112 | A1 | 12/2009 | Gelbin |
| 2010/0004363 | A1 | 1/2010 | Gelbin |
| 2010/0025636 | A1 | 2/2010 | Gelbin |
| 2010/0069542 | A1 | 3/2010 | Gelbin et al. |
| 2010/0076131 | A1 | 3/2010 | Gelbin |
| 2010/0190900 | A1 | 7/2010 | Gelbin |
| 2010/0208104 | A1 | 9/2010 | King et al. |
| 2011/0263760 | A1 | 10/2011 | Jakupca et al. |
| 2013/0190434 | A1 | 7/2013 | Zahalka |
| 2013/0225736 | A1 | 8/2013 | Jakupca et al. |
| 2013/0345346 | A1 | 12/2013 | Jakupca et al. |
| 2014/0329943 | A1 | 11/2014 | Jakupca et al. |
| 2014/0378590 | A1 * | 12/2014 | Jakupca .................. C08L 85/02 524/128 |
| 2015/0203636 | A1 | 7/2015 | Jakupca et al. |
| 2016/0237264 | A1 | 8/2016 | Jakupca et al. |
| 2016/0340493 | A1 * | 11/2016 | Jakupca .................. C08G 79/04 |

FOREIGN PATENT DOCUMENTS

| | | |
|---|---|---|
| JP | 55071774 A | 5/1980 |
| WO | 9948997 A1 | 9/1999 |
| WO | 2007009916 A1 | 1/2007 |
| WO | 2008028858 A1 | 3/2008 |
| WO | 2011017021 A1 | 2/2011 |

OTHER PUBLICATIONS

Written Opinion issued in PCT/US2019/017612 dated May 2, 2019 (5 pages).

Mick Jakupca, Jacob Lance, John Regula, Jacob Weingart, "Balancing the Properties and Performance of Polyolefin Stabilizer Packages", SPE Polyolefins Conference 2016.

Jacob Lance, Mick Jakupca, "Advanced Alkylphenol-Free Polymeric Phosphite Stabilizers", AMI Polyethylene Films 2016.

Sigma Aldrich, "Controlled Radical Polymerization Guide", 2012.

Michael Jakupca, Don Stevenson, Jacob Lance, Nina Ruegg, "Ancillary Benefits of Alkylphenol-Free High Molecular Weight Phosphite Stabilizer", SPE Polyolefins Conference, 2012.

Supplemental European Search Report for PCT/2010/053207.

Supplemental European Search Report for PCT/2013/046611.

Tony Moy, "Dispersants—an Overview on their Purpose, Value and Application" Sep. 11, 2018.

Dewitte, Greet, Dyneon N.V., "Polymer Processing Additives to Enlarge the Process Window for Polyolefins Extrusion," TAPPI—May 14, 2003.

Mathurin G. Meillon, Dave Morgan, David Bigio, Semen Kharchenko, Kalman Migler, "Eliminating Surface Melt Fracture using PPA: The role of PPA Domain Size", ANTEC 2004, pp. 94-100.

John Horns, Eric Adair, Dynamar Polymer Processing Additives, "The Effect Fluoropolymer Processing Additives and Stearate Additive Levels have on HDPE Resins", issued Oct. 2001.

"Surface Melt Fracture in Polymer Extrusions", J. Appl. Polymer Science, vol. 7, issue 2 (1963).

Joel D. Shore, David Ronis, Luc Piche, Martin Grant, "Theory of melt fracture instabilities in the capillary flow of polymer melts", Physical Review E vol. 55, No. 3 Mar. 1997, pp. 2976-2992.

S.R. Oriani and G.R. Chapman, "Fundamentals of Melt Fracture Elimination using Fluoropolymer Processing Aids", Best Paper SPE Extrusion Division, modified Apr. 3, 2015.

E.B. Bagley, "Surface Melt Fracture in Polymer Extrusion", J. Appl. Polymer Science, vol. 7, issue 2 (1963) pp. S7-S9.

Paul Neuman, "Enhancing Productivity in Blown Film, A New Perspective on Additive Interactions and Optimizing Polymer Processing Additive Efficiency through Process Parameters", 2007 PLACE Conference, Sep. 16, 2020.

Food & Drug Administration, "Guidance for Industry, Preparation of Pre-Market Submissions for Food Contact Substances, Chemistry Recommendations", Apr. 2002-Dec. 2007.

Michael Jakupca, Don Stevenson, Jacob Lance, Nina Ruegg, "Ancillary Benefits of an AlkylPhenol-Free High Molecular Weight Phosphite Stabilizer" SPE Polyolefins Conference 2012.

International Reporton Patentability of PCT/US2010/053207.

Lenka Votavova, Jaroslov Dobias, Michal Voldrich, Helena Cizkova, "Migration of Nonylphenols from Polymer Packaging" Czech J. Food Sci., vol. 27, 2009 No. 4, pp. 293-299.

International Search Report and Written Opinion, PCT/US10/53207.

* cited by examiner

TNPP = tris(nonylphenyl) phosphite
Oligomeric Phosphite = 4,4'-butylidene-bis(6-tert-butyl-3-methylphenyl-ditridecyl phosphite)
Polymeric phosphite 1 = Example #1
Polymeric phosphite 2 = Example #4

TNPP Formulation

Polymeric phosphite formulation

USE OF A POLYMERIC POLYPHOSPHITE AS A POLYMER PROCESSING AID

CROSS-REFERENCE TO RELATED APPLICATIONS

The present invention is filed under 35 U.S.C. § 371 as the U.S. national phase of International Application No. PCT/US2019/017612, filed 12 Feb. 2019, which designated the U.S. and which claims priority to U.S. patent application Ser. No. 15/896,119, filed 14 Feb. 2018, both applications of which are hereby fully incorporated by reference.

TECHNICAL FIELD

The invention described herein pertains generally to a polyolefin resin composition containing certain polymeric polyphosphites alone or in combination with another polymer processing aid (PPA). The combination of these two additives results in enhanced processing during melt extrusion.

BACKGROUND OF THE INVENTION

Organic phosphites are known for their anti-oxidant properties when added to polymers and other organic materials. The main purpose associated with the addition of a phosphites stabilizer to a polymeric resin is to prevent deterioration of the polymer during processing at high temperature. Polymer processing aids are used to improve the melt processing of polyolefins by reducing melt fracture. To increase the throughput of a resin during extrusion, one generally increases the speed of the screw. However, the viscoelastic behavior of the polymer melt, sets limits and if extrusion rates exceed a certain value, defects known as "melt fracture" occur on the surface of the extruded material. Use of processing aids helps to reduce or eliminate melt fracture, which is also known as "orange peel" or "sharkskin". Use of processing aids can result in increasing through-put and reducing sharkskin. There is a good deal of literature and patents on processing aids: (e.g., U.S. Pat. Nos. 3,125,547; 6,774,164; 6,610,408; 5,830,947; 7,662,324; 8,053,502; 8,110,262; and WO 2011/017021A1). The most common processing aids are fluoropolymers. Fluoropolymers are expensive additives and may be less effective in the presence of filler. For economic reasons, there is a desire to increase production rates for polyethylene products based on blow film and blow-molded process.

SUMMARY OF THE INVENTION

The present invention is directed to a polyolefin resin composition comprising a fluorine containing polymer processing aid and a second processing additive (a polymeric polyphosphite) that also is a polymer stabilizer. These polyolefin compositions have improved resistance to melt fracture during melt processing than other polyolefin compositions containing the fluorine processing aid and any other phosphite stabilizer.

During the extrusion of thermoplastic resins, particularly polyolefins, especially in the form of films, flow irregularities may appear at the outlet from the extruder die leading to surface defects and sometimes impairment of mechanical and/or optical properties. This phenomenon appears especially when a critical shear rate is exceeded. Below this critical rate, extrudates are smooth, while above this rate surface defects are observed. These defects, that are called "melt fracture", exist in several forms. At a shear rate slightly above the critical rate, films obtained by extrusion blow molding lose their transparency and gloss. For distinctly higher rates (that is to say at a higher productivity) homogeneity defects appear with smooth zones in a rough surface. These defects significantly reduce the optical and/or mechanical properties of the film. The same phenomena can be observed on extruded rods. When the surface of the rods loses its gloss and becomes matt and rough, it is often compared to "orange peel" or "sharkskin."

An extrusion agent may be added when a thermoplastic resin is extruded, which makes it possible to reduce surface defects. However, it is necessary that the addition of the extrusion agent does not lead to a deterioration in the yellowing index of the extruded resin. This is especially valuable in the extrusion of pipe (e.g., polyolefin pipe or polyvinyl chloride pipe). Preferred targeted, but non-limiting applications, include blown film, cast film, HDPE pipe, PP pipe, rigid PVC extrusion for pipe and window and door frames, etc.

The Applicant has surprisingly found that it is possible to reduce or eliminate extrusion defects without causing deterioration of the yellowing index of the extruded resin. The Applicant has further determined that use of the polymeric polyphosphites of the invention do not cause issues with most, if not all, hindered amine light stabilizers ("HALS"). Similar positive effects have been observed with antiblock additives, a non-limiting list of examples include, e.g., talc, silicas, calcium carbonate, kaolin/clay, mica, ethylene bis stearamide ("EBS"), stearyl erucamide, glycerol monostearate, zine stearate, silicone, etc. often used in synthetic polymers.

These and other objects of this invention will be evident when viewed in light of the drawings, detailed description and appended claims.

DETAILED DESCRIPTION OF THE INVENTION

Figure 1:
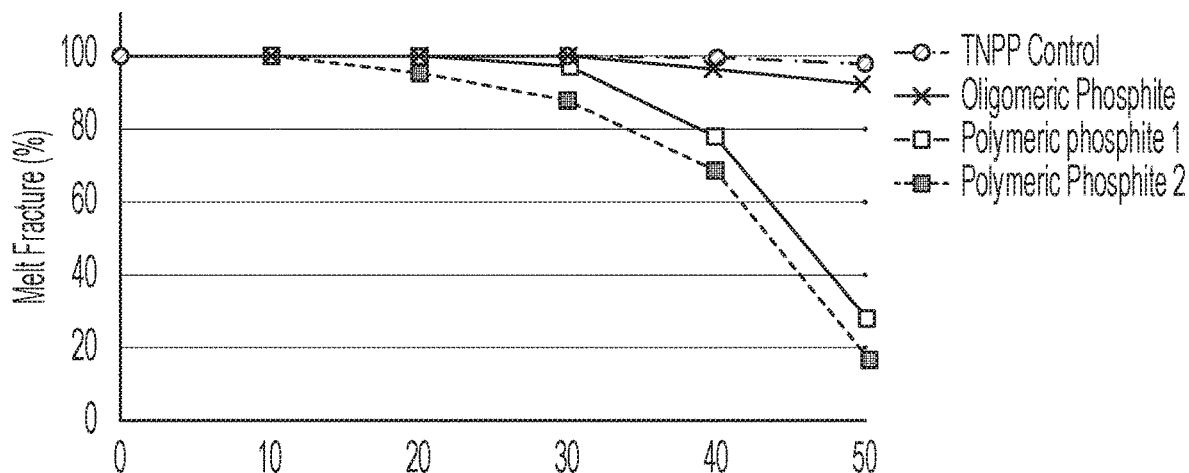
FIG. 1 is plot of the impact of various phosphites over time comparing melt fracture percentage.
Figure 2:
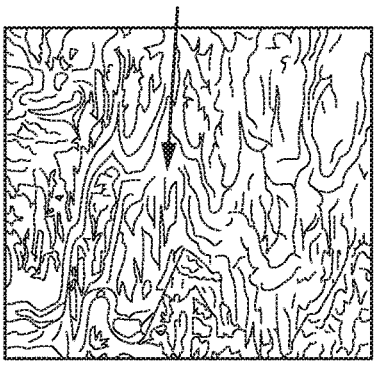
FIG. 2 is an optical photograph of melt fracture in a linear low-density polyethylene sample using an optical microscope using TNPP in the formulation.
Figure 3:
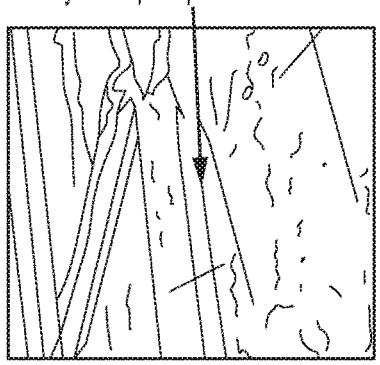
FIG. 3 is an optical photograph of melt fracture in a linear low-density polyethylene sample using an optical microscope using a polymeric phosphite formulation (Example #1) in the formulation.

The best mode for carrying out the invention will now be described for the purposes of illustrating the best mode known to the applicant at the time of the filing of this invention. The examples and figures are illustrative only and not meant to limit the invention, as measured by the scope and spirit of the claims.

Unless the context clearly indicates otherwise: the word "and" indicates the conjunctive; the word "or" indicates the disjunctive; when the article is phrased in the disjunctive, followed by the words "or both" or "combinations thereof" both the conjunctive and disjunctive are intended.

As used in this application, the term "approximately" is within 10% of the stated value, except where noted.

As further defined in this application, the term "fluoropolymer" includes, but is not limited to: any polymer having in its chain at least one monomer chosen from compounds containing a vinyl group capable of opening in order to polymerize and which contains, directly attached to this vinyl group, at least one fluorine atom, a fluoroalkyl group or a fluoroalkoxy group. As an example of a monomer, mention may be made of vinyl fluoride, vinylidene fluoride (VDF, $CH_2=CF_2$); trifluoroethylene ($VF_3$); chlorotrifluoroethylene (CTFE); 1,2-difluoroethylene; tetrafluoroethylene (TFE); hexafluoropropylene (HFP); and perfluoro(alkyl vinyl) ethers. The fluoropolymer may be a homopolymer or a copolymer, and it may also comprise non-fluorinated monomers such as ethylene or propylene. As an example, the fluoropolymer is chosen from: homo- and copolymers of vinylidene fluoride (VDF), preferably containing at least 50% by weight of VDF, the comonomer being chosen from chlorotrifluoroethylene (CTFE), hexafluoropropylene (HFP), trifluoroethylene ($VF_3$) and tetrafluoroethylene (TFE); homo- and copolymers of trifluoroethylene ($VF_3$); copolymers, and particularly terpolymers, associating chlorotrifluoroethylene (CTFE), tetrafluoroethylene (TFE), hexafluoropropylene (HFP) and/or ethylene unit residues and optionally VDF and/or $VF_3$ units; terpolymers of TFE, HFP and VDF; copolymers of TFE, propylene and optionally VDF. It will be possible for the fluoropolymer to be for example a terpolymer comprising by weight 30 to 70% TFE, 10 to 30% HFP and 5 to 50% VDF or else comprising by weight 45 to 65% TFE, 10 to 20% HFP and 15 to 35% VDF as described in U.S. Pat. No. 6,734,252 B1. It may also consist of the fluoropolymers described in U.S. Pat. No. 6,380,313 B1, particularly terpolymers comprising a perfluorovinylether, VDF and HFP. Other examples of fluoropolymers are given in U.S. Pat. No. 6,277,919 B1.

Advantageously, the fluoropolymer is a polyvinylidene fluoride (PVDF) homopolymer or copolymer. It has, in point of fact, a suitable viscosity in the transformation range of many thermoplastic resins. Preferably, better effectiveness of the extrusion agent is obtained when the PVDF contains, by weight, at least 50%, more preferably at least 75% and better still at least 85% VDF. Preferably, better effectiveness of the extrusion agent is obtained when the PVDF is of the thermoplastic type. The comonomer is advantageously HFP. Even more preferably, the copolymer will only comprise VDF and HPF as monomers. Advantageously, the PVDF has a viscosity extending from 100 Pas to 4000 Pa·s, the viscosity being measured at 230° C., at a shear gradient of 100 s$^{-1}$ with the aid of a capillary rheometer. The PVDF preferably has a viscosity extending from 1000 Pa·s to 2500 Pa·s, the viscosity being measured at 230° C., at a shear gradient of 100 s$^{-1}$ with the aid of a capillary rheometer. Thus, PVDFs marketed under the name trademark Kynarflex® are suitable for this formulation.

Other fluoropolymer processing aids can be used in the practice of the present invention and include those known in the art to mitigate effects such as melt fracture, high extrusion pressure, formation of deposits at the die exit and fluctuations in extrusion pressure or extrusion rate. They include the broad class of fluoropolymers as particulates or that are molten or fluid at the relevant processing temperature of the polymer, including fluoropolymers (e.g., PTFE), fluoroelastomers (e.g., from DDE & Dyneon) and fluoroplastics with relatively low melting temperature. Such low-melting fluoroplastics include but are not limited to polyvinylidene fluoride (PVDF), copolymers of tetrafluoroethylene (TFE) and hexafluoropropylene (HFP), copolymers of TFE and perfluoro(methyl vinyl) ether, and copolymers of TFE, HFP and vinylidene fluoride ($VF_2$). The fluoropolymer processing aids suitable for used in the practice of the present invention also include various multicomponent processing aid systems, in which at least one fluoropolymer is used in conjunction with other material. Other material can also be fluoropolymer, compositionally different from first fluoropolymer. In general, suitable fluoropolymer processing aids have fluorine to carbon ratio of at least 1:2, and preferably at least 1:1. Among the preferred fluoropolymers are the $VF_2$/HFP fluoroelastomers that typically contain 30-70 wt % $VF_2$, 30-70 wt % HFP, and 0-40 wt % TFE.

Useful thermoplastic fluoropolymers that may be used in the invention include homopolymers and copolymers of tetrafluoroethylene (such as Teflon® FEP fluorocarbon resin) and polyvinylidene fluoride. Fluoroelastomer processing aids may also be used in place of fluoroplastic polymers, and suitable fluoroelastomer process aids include, e.g., Dynamar® fluoroelastomer available from Dyneon and Viton® fluoroelastomer available from DuPont Dow Elastomers. Other fluoropolymers include stabilized polyvinylidene fluoride resins, such as Kynar® PVDF resin, available from Atofina Chemicals, Inc.

Fluoropolymers are provided in effective amounts. Preferably, a fluoropolymer is present in an amount less than 5000 ppm in the polymer to be processed, more preferably, greater than 10 ppm, such as from about 100-1000 ppm or, most preferably, from about 200-800 ppm.

As further used in this application, the term "polymer" or "synthetic polymer" includes, but is not limited to: polymers of monoolefins and diolefins such as polyethylene, polypropylene, polyisobutylene, poly-1-butene, poly-4-methylpentene, polyisoprene, polybutadiene, for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), and polymers of cycloolefins such as cyclopentene and norbornene, and blends of the polymers described above.

Copolymers of monoolefins and diolefins with each other or with other vinyl monomers such as ethylene/propylene, propylene/1-butene, propylene/isobutene, propylene/butadiene, ethylene/1-butene, ethylene/1-hexene, ethylene/1-octene, isobutylene/isoprene, ethylene/alkylacrylates, ethylene/alkylmethacrylates, ethylene/vinyl acetate, ethylene/acrylic acid (and salts, ionomers, thereof), terpolymers of ethylene, propylene, and dienes such as hexadiene, dicyclopentadiene, and ethylene-norbornene.

In general, the polymeric phosphites of this invention are added to the organic material to be stabilized in amounts from about 0.001 wt % to about 5 wt % of the weight of the organic material to be stabilized. A more preferred range is from about 0.01% to 2.0%. The most preferred range is from 0.025% to 1%.

Furthermore, it has been found that certain polymeric phosphites show improvement over other synergists that are commonly used with fluoropolymer process aids. Commercial polymeric processing aids often contain glycol based synergists such as polyethylene glycol, polycapralactone, and polypropyelene glycol to improve the performance when used in combination with these fluoropolymers. These synergists are considered to be interfacial agents that improve the ability of the fluoropolymer to coat the surface of the extruder barrel and die. However, these agents often cause oxidation and degradation to the polymer leading to increased color and loss of film properties. The liquid polymeric phosphites of formulas (I) through (IV) are antioxidants that improve both the melt fracture and the polymer stability when compared to these other polymer processing aid synergists.

While the present invention has been directed to just a few stabilized polymer compositions which are primarily polyolefins, there is no need to limit it to such. In fact, any of the polymers known in the art are useful in this invention, a non-exhaustive and non-limiting list including polyesters, polyurethanes, polyalkylene terephthalates, polysulfones, polyimides, polyphenylene ethers, styrenic polymers, polycarbonates, acrylic polymers, polyamides, polyacetals, halide-containing polymers and polyolefin homopolymers and copolymers. Additionally, included would be mixtures of different polymers, such as polyphenylene ether/styrenic resin blends, polyvinylchloride/ABS or other impact modified polymers, such as methacrylonitrile containing ABS, and polyester/ABS or polyester plus some other impact modifier may also be used. Such polymers are available commercially or may be made by means well known in the art. However, the phosphites of the invention are particularly useful in thermoplastic polymers, such as polyolefins, polyvinyl chlorides, polydiene rubbers, particularly polybutadiene rubbers, and styrenic polymers.

Polymers of mono-olefins and di-olefins, for example would include polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of mono-olefins and di-olefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/butadiene, isobutylene/isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene-propylene copolymers, LDPE/EVA, LDPE/EAA, LLDPE/EVA and LLDPE/EAA. Also included in this list would be rubbers or elastomers such as natural cis-1,4-polyisoprene rubber, synthetic cis-1,4-polyisoprene rubber, 3,4-polyisoprene rubber, styrene/butadiene copolymer rubbers, butadiene/acrylonitrile copolymer rubbers, isoprene/butadiene copolymer rubbers, styrene/isoprene/butadiene terpolymer rubbers, cis-1,4-polybutadiene rubbers, 1,3-polybutadiene rubbers as well as mixtures of such polymers and copolymers and their mixtures with polymers mentioned.

Thermoplastic polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or a-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, such as acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride tercopolymer, vinyl chloride-styrene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene with contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethylol-cyclohexane terephthalate, poly-[2,2,4-(4-hydroxyphenyl)-propane] terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide-4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

As used herein, "HALS" or "hindered amine light stabilizers" include, but are not limited to sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of NN-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5)-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropyiamino)ethane, the condensate of 2-chloro-4,6-di-(4-n-butyiamino-1,2,2,6,6-pentamethylpiperidyl)-1,3,5-tri-azine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamine-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine; a condensate of 1,6-hexanediamine and 2,4,6-trichloro-1,3,5-triazine as well as N,N-dibutylamine and 4-butylamino-2,2,6,6-tetramethylpiperidine; N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,6,6-pentamethyl-4-piperidyloxycarbonyl)-2-4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-.alpha.-olefin copolymer with 2,2,6,6-tetramethyl-4-aminopiperidine or 1,2,2,6,6-pentamethyl-4-aminopiperidine, 2,4 bis[N,-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)-oxymethyl-3,3,5-trimethyl-2-morpholinone, 5-(2-ethyl hexanoyl) oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

Film production is one of the largest and most important applications for polyolefins. Process aids are often included to coat the die surface to improve the film production. These process aids improve the surface of the films and the production process by preventing melt fracture. Melt fracture is a phenomenon where the surface of the polymer will form bands of varying thickness and texture. This is caused by the polymer slipping and sticking to the surface of the die at certain shear and temperature ranges. The inclusion of process aids allows the melt fracture to clear up at a faster rate during startup and allows the equipment to run at higher production speeds to produce more product.

It has been found that certain polymeric polyphosphites when used in combination with these polymeric process aids can enhance these effects and act as a synergist. In addition, it has also been found that these polymeric process aids may be used at lower use levels when in combination with these polymeric polyphosphites thereby lowering the formulation costs for the film producer.

The present invention is directed to novel liquid polymeric polyphosphites of the general structure I as stabilizers for polymers during processing.

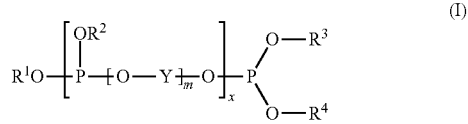

(I)

wherein
each $R^1$, $R^2$, $R^3$ and $R^4$ can be the same or different and independently selected from the group consisting of $C_{12-20}$ alkyl, $C_{12-22}$ alkenyl, $C_{12-40}$ cycloalkyl, $C_{12-40}$ cycloalkylene, $C_{12-20}$ alkyl glycol ethers and Y—OH as an end-capping group;
each Y is independently selected from the group consisting of $C_{2-40}$ alkylene, $C_{7-40}$ cycloalkylene, $C_{3-20}$ alkyl glycol ethers, $C_{3-40}$ alkyl lactone, and —$R^7$—N($R^8$)—$R^9$—;
$R^7$, $R^8$ and $R^9$ are independently selected from the group consisting of $C_{1-20}$ alkyl, $C_{2-22}$ alkenyl, $C_{6-40}$ cycloalkyl, $C_{7-40}$ cycloalkylene and H;

m is an integral value ranging from 1 to 100 inclusive;

x is an integral value ranging from 2 to 1,000 with the proviso that when —O—Y is a $C_{3-20}$ alkyl glycol ether, x is an integral value no less than 7; and further wherein no more than two of $R^1$, $R^2$, $R^3$ and $R^4$ are terminated with an hydroxyl group.

The present invention is also directed to novel copolymeric polyphosphites of the general structure II as stabilizers for polymers during processing.

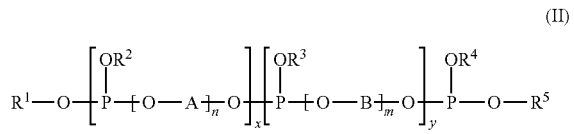

(II)

wherein each $R^1$, $R^2$, $R^3$, $R^4$ and $R^5$ can be the same or different and independently selected from the group consisting of $C_{12-20}$ alkyl, $C_{12-22}$ alkenyl, $C_{12-40}$ cycloalkyl, $C_{12-40}$ cycloalkenyl, $C_{12-20}$ alkyl glycol ethers and A-OH and B-OH as an end-capping groups;

each A and B are different and independently selected from the group consisting of $C_{2-40}$ alkylene, $C_{7-40}$ cycloalkylene, $C_{3-20}$ alkyl glycol ethers, $C_{3-40}$ alkyl lactone, and —$R^7$—N($R^8$)—$R^9$— wherein $R^7$, $R^8$ and $R^9$ are independently selected from the group $C_{1-20}$ alkyl, $C_{2-22}$ alkenyl, $C_{6-40}$ cycloalkyl, $C_{7-40}$ cycloalkylene and H;

m and n are integral values ranging from 1 to 100 inclusive;

x and y are integral values ranging from 1 to 1,000 wherein x+y sum to at least 3, with the proviso that when —O-A or —O-B are $C_{3-20}$ alkyl glycol ethers, at least one of x or y is an integral value no less than 7; and further wherein no more than two of $R^1$, $R^2$, $R^3$, $R^4$ and $R^5$ are terminated with an hydroxyl group.

The present invention is also directed to the novel cycloaliphatic homopolyphosphites (Structure III) and cycloaliphatic copolyphosphites (Structure IV).

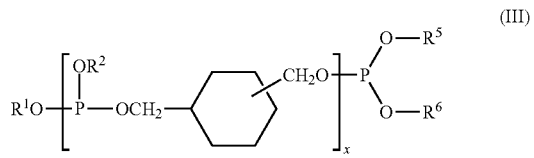

(III)

wherein each $R^1$, $R^2$, $R^5$ and $R^6$ can be the same or different and independently selected from the group consisting of $C_{1-20}$ alkyl, $C_{2-22}$ alkenyl, $C_{6-40}$ cycloalkyl, $C_{7-40}$ cycloalkylene, $C_{3-20}$ methoxy alkyl glycol ethers, $C_{3-20}$ alkyl glycol ethers or Y—OH (serving as an end capping moiety) for $R^1$, $R^2$, $R^5$ and $R^6$;

Y is selected from the group consisting of $C_{2-40}$ alkylene, $C_{2-40}$ alkyl lactone, and $C_{2-40}$ cycloalkyl and further comprises $C_{2-20}$ alkyl glycol ethers when Y is in the polyphosphite backbone;

x is an integral value ranging from 8 to 1,000; or

Formula (IV)

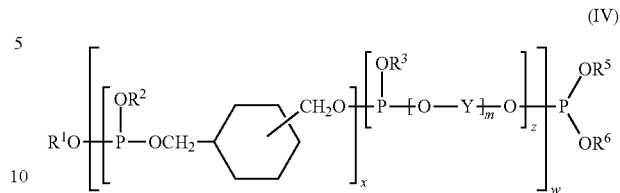

(IV)

where each $R^1$, $R^2$, $R^3$, $R^4$, $R^5$ and $R^6$ can be the same or different and independently selected from the group consisting of $C_{1-20}$ alkyl, $C_{2-22}$ alkenyl, $C_{6-40}$ cycloalkyl, $C_{7-40}$ cycloalkylene, $C_{3-20}$ methoxy alkyl glycol ethers, $C_{3-20}$ alkyl glycol ethers or Y—OH (serving as an end capping moiety) for $R^1$, $R^2$, $R^3$, $R^4$, $R^5$ and $R^6$;

Y is selected from the group consisting of $C_{2-40}$ alkylene, $C_{2-40}$ alkyl lactone, and $C_{2-40}$ cycloalkyl and further comprises $C_{2-20}$ alkyl glycol ethers when Y is in the polyphosphite backbone (e.g., ethylene, propylene, caprylactone, polyalkylene glycol);

x is an integral value ranging from 8 to 1,000;

z is an integral value ranging from 0 to 1,000 with the proviso that when z is 8 or greater, then x is an integral value ranging from 1 to 1,000;

m is an integral value ranging from 1 to 20;

w is an integral value ranging from 1 to 1,000.

The below examples illustrate the performance advantages when using the polymeric process aids in combination with a polymeric phosphite.

EXAMPLE #1

PPG 400 (95 g, 0.237 mol), triphenyl phosphite (73 g, 0.235 mol), a mixture of lauryl and myristyl alcohol with a hydroxyl number of about 280, (47 g, 0.235 mol), and 0.8 grams of potassium hydroxide were added together. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a clear, colorless liquid.

EXAMPLE 2

PPG 400 (48 g, 0.12 mol), triphenyl phosphite (73 g, 0.235 mol), lauryl alcohol, (47 g, 0.235 mol), dipropylene glycol (16 g 0.12 mol) and 0.8 grams of potassium hydroxide were added together. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a clear, colorless liquid.

EXAMPLE 3

1,6 hexanediol (57 g, 0.48 mol), triphenyl phosphite (150 g, 0.48 mol), a mixture of lauryl and myristyl alcohol with a hydroxyl number of about 280, (97 g, 0.48 mol), and 0.8 grams of potassium hydroxide were added together. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a hazy, colorless liquid.

EXAMPLE 4

The apparatus in Example #1 was used. 100 grams (0.69 mol) of cyclohexane dimethanol, triphenyl phosphite (237 g, 0.76 mol), a mixture of lauryl and myristyl alcohol with a hydroxyl number of about 280, (190 g, 0.95 mol), and and 0.4 grams of potassium hydroxide were added. The mixture was mixed well and heated to approximately 150° C. under nitrogen and held at the temperature for 1 hour. The pressure was then gradually reduced to 0.3 mm Hg and the temperature was increased to 180° C. over a course of 1 hour. The reaction contents were held at 180° C. under the vacuum for 2 hours at which point no more phenol was distilling out. The vacuum was then broken by nitrogen and the crude product was cooled to ambient temperature. The product was a non-viscous liquid.

EXAMPLE 5

The apparatus in Example #1 was used. 20 grams (0.14 mol) of cyclohexane dimethanol, 7 g polypropylene glycol 400 (0.02 m), triphenyl phosphite (100 g, 0.32 mol), a mixture of lauryl and myristyl alcohol with a hydroxyl number of about 280 (136 g, 0.69 mol) and 0.4 grams of potassium hydroxide were added. The mixture was mixed well and heated to approximately 150° C. under nitrogen and held at the temperature for 1 hour. The pressure was then gradually reduced to 0.3 mm Hg and the temperature was increased to 180° C. over a course of 1 hour. The reaction contents were held at 180° C. under the vacuum for 2 hours at which point no more phenol was distilling out. The vacuum was then broken by nitrogen and the crude product was cooled to ambient temperature. The product was a non-viscous liquid.

Characteristics of the various synthesized additives may be characterized at least in part by the following tables.

TABLE I

| | Example | | | | |
|---|---|---|---|---|---|
| | #1 | #2 | #3 | #4 | #5 |
| appearance | liquid | liquid | liquid | liquid | liquid |
| Acid Value ("AV") (initial) | 0.01 | 0.05 | 0.01 | 0.01 | 0.01 |
| % P | 4.9 | 5.9 | 8.9 | 7.6 | 6.0 |
| Avg. MW | 9,111 | 7,250 | 31,515 | 13,957 | 1,651 |

The following examples are meant to illustrate the benefits of the current invention over conventional phosphites. They are not intended to cover every single application which these could be used.

EXAMPLE 6

Blown Film

A blown film trial was run to compare the performance of the polymeric phosphites to the performance of a standard phosphite such as TNPP and an oligomeric (dimeric) phosphite such as 4,4'-butylidene-bis(6-tert-butyl-3-metylphenyl-ditridecyl phosphite), shown below.

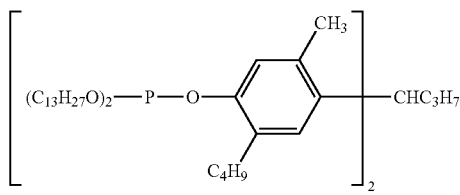

All phosphites were loaded into the polymer at 1800 ppm along with 700 ppm of the PPA. The blown film was produced according to the conditions: Die Gap: 50 mil; Blow up ratio: 2:5:1; Film thickness: 1-1.5 mil; and Output: 250 lbs/hr.

The film line was run at conditions in which the film would initially exhibit 100% melt fracture across the surface. Each formulation was monitored for 50 min. to see which formulations cleared the quickest. The amount of melt fracture remaining was monitored visually every 10 min.

After 50 min the blown film containing the two polymeric phosphite was nearly free of melt fracture whereas the TNPP and oligomeric (dimeric) formulations showed only a very slight improvement in the amount of melt fracture. See FIG. 1 in which the tris(nonylphenyl) phosphite showed no improvement; the oligomeric (dimeric) phosphite, namely 4,4'-butylidene-bis(6-tert-butyl-3-methylphenyl-ditridecyl phosphite) also showed essentially no improvement, while the polymeric polyphosphite of Example #1 and the polymeric polyphosphite of Example #4 illustrated a very significant improvement.

This synergy between the polymeric phosphite and the process aid would offer an advantage to the film producer by allowing them to start up their equipment faster and produce quality film faster than with a conventional phosphite.

EXAMPLE 7

Time to Clear Ribbon Die 20 mil film was produced on an 18 mm lab Brabender using a ribbon die attachment. The extruder was run at conditions that would produce film with 100% melt fracture at start up. Formulations containing the polymeric process aid and two phosphites were compared to see how long each of these would take to clear the melt fracture. Polymeric phosphite 1 was compared to TNPP after 30 minutes of run time on the extruder. The amount of melt fracture remaining was compared by the appearance of the film under magnification.

The polymeric polyphosphite 1 (Example #1) had completely cleared the melt fracture in 30 min. while the formulation containing TNPP still showed 100% melt fracture. This indicates that the polymeric phosphites aid in coating the process aid on the extruder die and would allow for a film line to start up faster when using the polymeric polyphosphite.

EXAMPLE 8

Lower Use Levels of PPA

The polymeric polyphosphite was evaluated to see if it could perform as well as a standard phosphite even with reduced loading levels of the PPA. 20 mil film was produced on an 18 mm lab Brabender using a ribbon die attachment. The extruder was run at conditions that would produce film with 100% melt fracture at start up. Formulations containing 1800 ppm of each phosphite were evaluated. The formulation with TNPP had 700 ppm of the PPA while the formulation containing the polymeric phosphite contained only 350 ppm of the PPA.

The amount of melt fracture was estimated by visually examining the films after 30 min, 60 min, and 90 after startup of the extrusion process. The Polymeric Phosphite 1 (Example #1) exhibited lower melt fracture at all time intervals compared to the TNPP even with half of the loading level of the PPA.

TABLE II

| Phosphite | PPA Level | % Melt Fracture 30 Min | % Melt Fracture 60 Min | % Melt Fracture 90 Min |
|---|---|---|---|---|
| TNPP | 700 ppm | 60 | 40 | 25 |
| Polymeric Phosphite 1 (Example #1) | 350 ppm | 50 | 10 | <5 |

EXAMPLE 9

Increased Production Output

The polymeric phosphite was evaluated vs. the standard phosphite TNPP to see if it could allow increased run rates while avoiding melt fracture. The two phosphites were loaded at 1800 ppm with 700 ppm of the PPA. A 20 mil film was produced on an 18 mm lab Brabender using a ribbon die attachment. The extruder was run at conditions that would produce film with 100% melt fracture at start up. Each formulation was run until the melt fracture had completely cleared when the extruder as operated at 10 RPMS. The RPMS were then increased for each until melt fracture was seen on the surface of the film. The polymeric phosphite allowed the extruder to be operated at higher RPMS therefore increasing the production output vs. TNPP. The formulation containing the polymeric phosphite was able run up to 45 RPMS before any melt fracture was observed on the surface of the film. The TNPP formulations began to exhibit melt fracture between 25-30 RPMs. Therefore, the polymeric phosphite was just as effective at a 50% increase in run rate vs. TNPP. This would allow a film manufacture to run their equipment at higher rates and thus increasing their film out with adding costly equipment.

EXAMPLE 10

Reduced Pressure

Pressure reading at the die surface can indicate the effectiveness of the PPA. Lower die pressure may lead to less shear and lower temperatures as the film is produced. Lowering the temperature while maintaining film properties can allow for increased output. One of the limiting factors for film output is the cooling rate of the film. The film must be cooled sufficiently before winding so that it does not stick. If the film can be produced at a lower temperature due to decreased pressure, the production output can be increased since the lower temperature film will need less cooling.

The polymeric phosphite was compared to tris(2,4 di-tertbutyphenol) phosphite which is widely used commercially in film applications. The phosphites were compared using two different types of PPA's produced by 3M, Dynamar® 5920 and Dynamar® 9614. The phosphites were compared at equal loading levels and in combination with an equal loading level of each PPA. The studies were run on a 1 mil LLDPE resin.

TABLE III

| | Formulations | | | |
|---|---|---|---|---|
| | A | B | C | D |
| Octadecyl 3,5-Di-t-butyl-4 hydroxyhydrocinnamate | 500 | 500 | 500 | 500 |
| Dynamar ® 5920 | 600 | | 600 | |
| Dynamar ® 9614 | | 300 | | 300 |
| Talc | 5000 | 5000 | 5000 | 5000 |
| Polymeric Phosphite Example #1 | 1500 | 1500 | | |
| tris(2,4 di-tertbutyphenol) phosphite | | | 1500 | 1500 |

Figure 4:
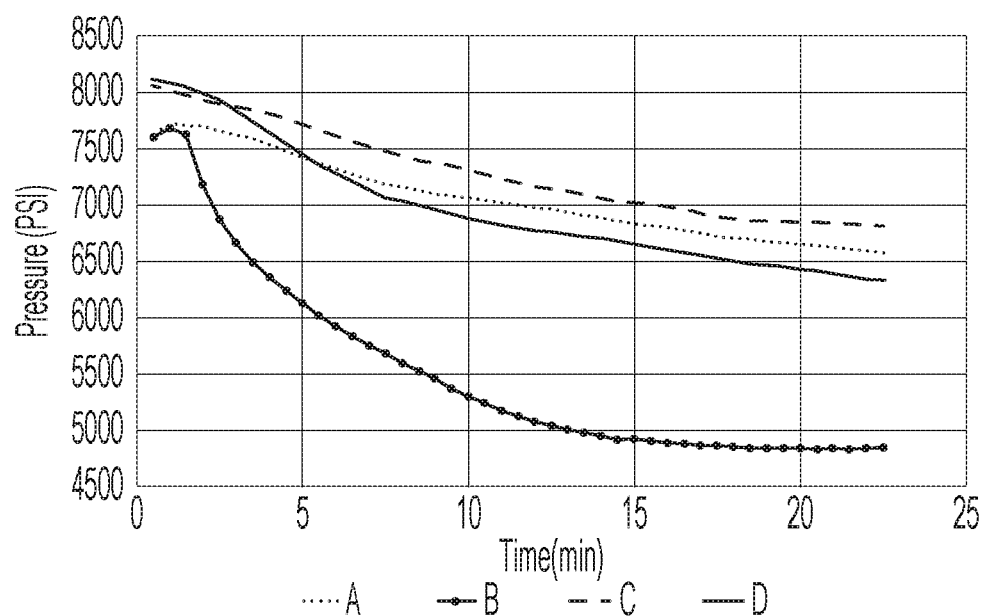
FIG. 4 is a plot of pressure at the die head using various processing aids.

The polymeric phosphites produce lower pressure at the die surface vs. the tris(2,4 di-tertbutyphenol) phosphite regardless of which PPA was used as illustrated in FIG. 4.

Polymer processing aids synergists, e.g., polyethylene glycol and polycapralactones are widely used with flouropolymers due at least in part to their cost and enhanced performance. The issue with these is that they can cause some oxidation and degradation in the polymer. What is important is that the polyphosphites of the instant invention (Formulas I through IV) function also as antioxidants and maintain the polymer properties while providing the same or better benefits. In the above table, formulation A and C were made from PPA using one on these synergists and formulations B and D were made using a polymeric processing aid that was all fluoropolymer.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A blown film manufactured by a process comprising the steps: compounding a composition having:
   a polyolefin;
   a fluorinated polymer having a polymeric unit synthesized from any of the following monomers: vinylidene fluoride, hexafluoropropylene, and 1,1 difluoroethylene; and
   a product of a process having the following steps:
      creating a reaction mixture within a reaction vessel, wherein the reaction mixture has the following reactants:
         (i) (a) polypropylene glycol having an average molecular weight of 400, or
            (b) polypropylene glycol having an average molecular weight of 400 and cyclohexane dimethanol,
         (ii) triphenyl phosphite,
         (iii) a mixture of lauryl and myristyl alcohol with a hydroxyl number of about 280, and
         (iv) potassium hydroxide;

in a first reaction step, heating the reaction mixture to 160° C.-162° C. and maintaining that temperature while mixing the reaction mixture under nitrogen;

in a second reaction step that immediately follows the first reaction step, heating the reaction mixture to 170° C.-172° C. and maintaining that temperature while mixing the reaction mixture and reducing the pressure in the reaction vessel to 0.3 mmHg; and in a third reaction step that immediately follows the second reaction step, holding the reaction mixture at 170° C.-172° C. and under vacuum;

manufacturing a blown film using the compounded composition, wherein the blown film has reduced melt fracture relative to a blown film manufactured by the same process and with a composition that is otherwise the same but does not include the product of a process.

2. The blown film of claim 1, wherein the product of a process has a molecule having the following chemical structure:

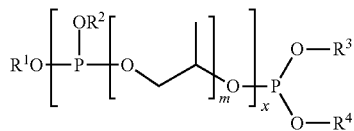

wherein
each $R^1$, $R^2$, $R^3$ and $R^4$ is independently selected and is a $C_{10}$-$C_{18}$ alkyl moiety;
m is an integer ranging from 3 to 11; and
x is an integer ranging from 1 to 122;

or

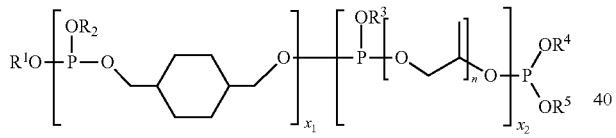

wherein
each $R^2$, $R^3$, $R^4$ and $R^5$ is independently selected and is a $C_{10}$-$C_{18}$ alkyl moiety;
n is an integer ranging from 3 to 11; and
the sum of $X_1+X_2$ is an integer ranging from 1-251.

3. An extruded film manufactured by a process comprising the steps: compounding a composition having:
a polyolefin;
a fluorinated polymer having a polymeric unit synthesized from any of the following monomers: vinylidene fluoride, hexafluoropropylene, and 1,1 difluoroethylene; and
a product of a process having the following steps:
creating a reaction mixture within a reaction vessel, wherein the reaction mixture has the following reactants:

(i)(a) polypropylene glycol having an average molecular weight of 400, or
(b) polypropylene glycol having an average molecular weight of 400 and cyclohexane dimethanol,
(ii) triphenyl phosphite,
(iii) a mixture of lauryl and myristyl alcohol with a hydroxyl number of about 280, and
(iv) potassium hydroxide;

in a first reaction step, heating the reaction mixture to 160° C.-162° C. and maintaining that temperature while mixing the reaction mixture under nitrogen;

in a second reaction step that immediately follows the first reaction step, heating the reaction mixture to 170° C.-172° C. and maintaining that temperature while mixing the reaction mixture and reducing the pressure in the reaction vessel to 0.3 mmHg; and in a third reaction step that immediately follows the second reaction step, holding the reaction mixture at 170° C.-172° C. and under vacuum;

manufacturing an extruded film using the compounded composition, wherein the extruded film has reduced melt fracture relative to an extruded film manufactured by the same process and with a composition that is otherwise the same but does not include the product of a process.

4. The extruded film of claim 3, wherein the extruded film is a blown film.

5. The extruded film of claim 3, wherein the product of a process has a molecule having the following chemical structure:

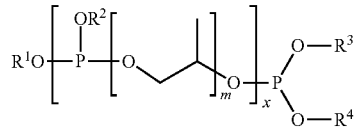

wherein
each $R^1$, $R^2$, $R^3$ and $R^4$ is independently selected and is a $C_{10}$-$C_{18}$ alkyl moiety;
m is an integer ranging from 3 to 11; and
x is an integer ranging from 1 to 122;

or

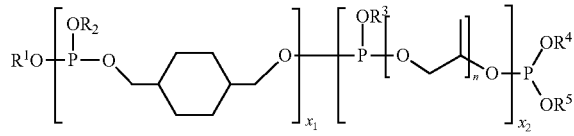

wherein
each $R^2$, $R^3$, $R^4$ and $R^5$ is independently selected and is a $C_{10}$-$C_{18}$ alkyl moiety;
n is an integer ranging from 3 to 11; and
the sum of $X_1+X_2$ is an integer ranging from 1-251.

* * * * *